(12) United States Patent
Lo et al.

(10) Patent No.: US 12,488,542 B2
(45) Date of Patent: Dec. 2, 2025

(54) METHOD, SYSTEM AND COMPUTER-READABLE STORAGE MEDIUM FOR DISTRIBUTING AUGMENTED REALITY CONTENT

(71) Applicant: CREOTE STUDIO LIMITED, Hong Kong (CN)

(72) Inventors: Wai Seng Roy Lo, Hong Kong (CN); Sum Yin Coby Or, Hong Kong (CN)

(73) Assignee: CREOTE STUDIO LIMITED, Hong Kong (CN)

( * ) Notice: Subject to any disclaimer, the term of this patent is extended or adjusted under 35 U.S.C. 154(b) by 308 days.

(21) Appl. No.: 18/015,715

(22) PCT Filed: Aug. 20, 2021

(86) PCT No.: PCT/CN2021/113686
§ 371 (c)(1),
(2) Date: Jan. 11, 2023

(87) PCT Pub. No.: WO2022/057566
PCT Pub. Date: Mar. 24, 2022

(65) Prior Publication Data
US 2023/0274506 A1    Aug. 31, 2023

(30) Foreign Application Priority Data
Sep. 21, 2020    (HK) .......................... 32020016598.5

(51) Int. Cl.
G06T 19/00      (2011.01)
G06F 16/958     (2019.01)

(52) U.S. Cl.
CPC .......... *G06T 19/006* (2013.01); *G06F 16/958* (2019.01)

(58) Field of Classification Search
None
See application file for complete search history.

(56) References Cited

U.S. PATENT DOCUMENTS

| 8,682,879 | B2 * | 3/2014 | Kim ...................... G09G 5/377 |
| | | | 707/706 |
| 9,064,326 | B1 * | 6/2015 | Loxam ................... G06V 20/20 |
| 10,777,017 | B1 * | 9/2020 | Saiger .................. G06F 16/955 |

(Continued)

OTHER PUBLICATIONS

Langlotz et al., "Next-Generation Augmented Reality Browsers: Rich, Seamless and Adaptive", 2014 (Year: 2014).*

(Continued)

*Primary Examiner* — Hilina K Demeter

(57) ABSTRACT

A method, a system and a computer-readable storage medium for distributing augmented reality content are disclosed, wherein the method includes steps of: generating augmented reality codes according to augmented reality content configuration information, wherein the augmented reality content configuration information comprises: augmented reality page information, augmented reality content information, and augmented reality trigger point information. The present invention enables the website to automatically change the effect of the augmented reality trigger point on the website, which can reduce the maintenance cost and improve the distribution efficiency of the augmented reality content.

2 Claims, 3 Drawing Sheets

(56) References Cited

U.S. PATENT DOCUMENTS

| | | | |
|---|---|---|---|
| 2016/0253844 A1* | 9/2016 | Petrovskaya | G06Q 50/01 |
| | | | 345/633 |
| 2019/0238648 A1* | 8/2019 | Goel | F16H 61/0021 |
| 2020/0219319 A1* | 7/2020 | Lashmar | G06Q 30/0269 |
| 2021/0150815 A1* | 5/2021 | Ju | G06T 17/20 |
| 2021/0200943 A1* | 7/2021 | Aviyam | G06F 16/953 |
| 2022/0101416 A1* | 3/2022 | Boscolo | G06Q 50/01 |

OTHER PUBLICATIONS

Srinivasa et al., "Augmented Reality Adaptive Web Content", (Year: 2016).*

\* cited by examiner

METHOD, SYSTEM AND COMPUTER-READABLE STORAGE MEDIUM FOR DISTRIBUTING AUGMENTED REALITY CONTENT

BACKGROUND OF THE PRESENT INVENTION

Field of Invention

The present invention relates to a technical field of augmented reality, and more particularly to a method, a system and a computer-readable storage medium for distributing augmented reality content.

Description of Related Arts

Conventional WebAR technology is based on HTML5, with which the Augmented Reality (AR) function can be easily embedded into various Web pages through the link mechanism, and can be forwarded, shared and disseminated through the website conveniently. However, the website is generally maintained by the network administrator. When the website needs to add, modify or remove the augmented reality effect in the webpage, it is necessary to hire additional professional and technical personnel to manually modify the code of the relevant webpage, thus increasing the operating cost of the website.

SUMMARY OF THE PRESENT INVENTION

An object of the present invention is to provide a method for distributing augmented reality content, which automatically manages augmented reality trigger points on a webpage.

According to an embodiment of the present invention, a method for distributing augmented reality content is provided, comprising steps of:
  generating augmented reality codes according to augmented reality content configuration information, wherein the augmented reality content configuration information comprises: augmented reality page information, augmented reality content information, and augmented reality trigger point information; and
  injecting the augmented reality codes into at least one webpage according to the augmented reality content configuration information.

Preferably, the augmented reality trigger point information comprises information of an interactable element, and the interactable element senses a user operation after a terminal is operated, so as to trigger and display the augmented reality content.

Preferably, the augmented reality trigger point information further comprises reference point information of a position of the interactable element in the webpage.

Preferably, injecting the augmented reality codes into at least one webpage according to the augmented reality content configuration information comprises specific steps of: searching ID or Class of a corresponding reference point in a source code file of the webpage according to the reference point information, and then injecting the augmented reality codes into the corresponding reference point.

Preferably, the method for distributing the augmented reality content further comprises steps of: receiving a user operation, and generating the augmented reality content configuration information according to the user operation before generating the augmented reality codes according to the augmented reality content configuration information.

Preferably, generating the augmented reality content configuration information according to the user operation comprises specific steps of:
  generating the augmented reality page information based on the user operation;
  generating the augmented reality content information based on the user operation; and
  generating the augmented reality trigger point information based on the user operation.

Preferably, the method for distributing the augmented reality content further comprises steps of: before generating the augmented reality codes according to the augmented reality content configuration information, judging whether the webpage is set with already existed augmented reality content; if yes, generating the augmented reality codes according to the augmented reality content configuration information; if no, refusing generating the augmented reality codes according to the augmented reality content configuration information.

Preferably, the method for distributing the augmented reality content further comprises steps of: authenticating a website to which the webpage belongs; analyzing a domain name, an address, and webpage codes of the website, and determining whether the webpage is qualified for injecting the augmented reality codes.

Preferably, judging whether the webpage is set with the already existed augmented reality content comprises specific steps of: identifying domain information of the webpage; identifying address information of the webpage; extracting corresponding augmented reality content configuration information of the webpage according to the domain information and the address information, and judging whether the webpage is set with the already existed augmented reality content according to the corresponding augmented reality content configuration information.

According to another embodiment of the present invention, a system for distributing augmented reality content is provided, comprising: an augmented reality code generation module to generate augmented reality codes according to augmented reality content configuration information, and an augmented reality code injection module for injecting the augmented reality codes into at least one webpage according to the augmented reality content configuration information; wherein the augmented reality content configuration information comprises augmented reality page information, augmented reality content information and augmented reality trigger point information.

Preferably, the augmented reality trigger point information comprises information of an interactable element, and the interactable element senses a user operation after a terminal is operated, so as to trigger and display the augmented reality content.

Preferably, the augmented reality trigger point information further comprises reference point information of a position of the interactable element in the webpage.

Preferably, the augmented reality code injection module searches ID or Class of a corresponding reference point in a source code file of the webpage according to the reference point information, and then injects the augmented reality codes into the corresponding reference point.

Preferably, the system for distributing the augmented reality content further comprises an augmented reality content configuration module for receiving a user operation and generating the augmented reality content configuration information according to the user operation before generating the augmented reality codes according to the augmented reality content configuration information.

Preferably, before generating the augmented reality codes according to the augmented reality content configuration information, the augmented reality code generation module judges whether the webpage is set with already existed augmented reality content; if yes, generates the augmented reality codes according to the augmented reality content configuration information; if no, refuses generating the augmented reality codes according to the augmented reality content configuration information.

Preferably, the method for distributing the augmented reality content further comprises a website and webpage identification module; wherein the website and webpage identification module comprises: a domain identification module for identifying domain information of the webpage; an address identification module for identifying address information of the webpage; and a configuration extraction module for extracting the augmented reality content configuration information and sending the augmented reality content configuration information to the augmented reality code generation module.

Preferably, the method for distributing the augmented reality content further comprises a database for storing the augmented reality content configuration information.

According to yet another embodiment of the present invention, a computer-readable storage medium is provided for storing a computer program instruction, wherein when the computer program instruction is executed by a processor, the steps of the above method for distributing the augmented reality content are realized.

Compared with the prior art, the present invention has the following beneficial effects: generating the augmented reality codes according to the augmented reality content configuration information, and injecting the augmented reality codes into at least one webpage according to the augmented reality content configuration information. The present invention enables the website to automatically change the effect of the augmented reality trigger point on the website, which can reduce the maintenance cost of the website and improve the distribution efficiency of the augmented reality content.

DETAILED DESCRIPTION OF THE PREFERRED EMBODIMENT

In order to make the object, technical solution and advantages of the present invention clearer, the present invention will be further described below in conjunction with the accompanying drawings and embodiments. It should be understood that the embodiments described here are exemplary only and not intended to be limiting.

The implementation of the present invention will be described in detail below in conjunction with the embodiments.

Embodiment 1

Figure 1:
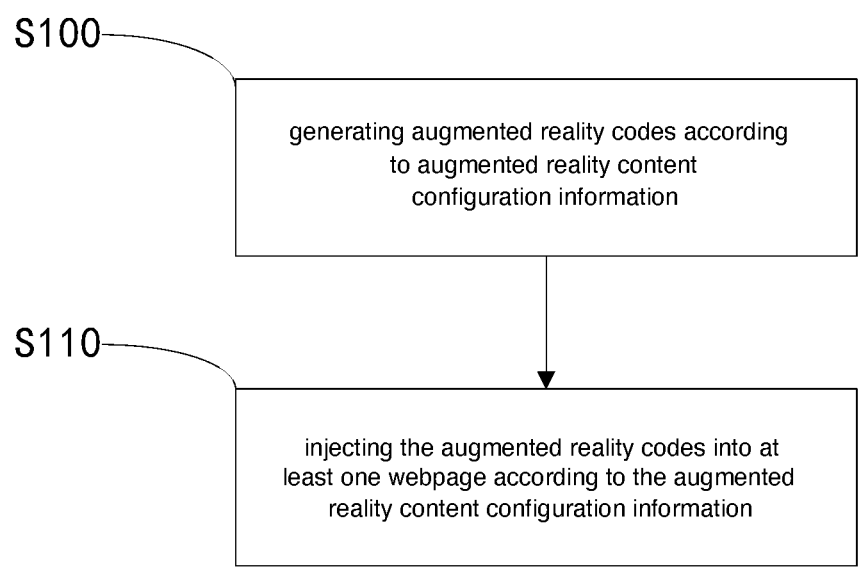
FIG. 1 is a flowchart of a method for distributing augmented reality content according to an embodiment 1 of the present invention.

FIG. 1 is a flowchart of a method for distributing augmented reality content according to the embodiment 1 of the present invention. Referring to FIG. 1, the method for distributing the augmented reality content comprises steps of:

S100: generating augmented reality codes according to augmented reality content configuration information, wherein the augmented reality content configuration information comprises: augmented reality page information, augmented reality content information, and augmented reality trigger point information; and S110: injecting the augmented reality codes into at least one webpage according to the augmented reality content configuration information.

In the embodiment 1, the augmented reality page information may include page information corresponding to the augmented reality content configuration information, such as a page identifier, an access address, etc. In the embodiment 1, one piece of augmented reality content configuration information may correspond to only one webpage. In other embodiments, one piece of augmented reality content configuration information may correspond to multiple webpages. The augmented reality content information may include augmented reality content corresponding to the webpage and its access link. The augmented reality trigger point information may include information of an interactable element, such as display effect information, position information, and type information of the interactable element. The interactable element senses a user operation after a terminal is operated, so as to trigger and display the augmented reality content. The interactable element may be webpage controls such as buttons, pictures, and hypertext links.

According to the embodiment 1, the augmented reality trigger point information further comprises reference point information of a position of the interactable element in the webpage.

According to the embodiment 1, injecting the augmented reality codes into at least one webpage according to the augmented reality content configuration information comprises specific steps of: searching ID or Class of a corresponding reference point in a source code file of the webpage according to the reference point information, and then injecting the augmented reality codes into the corresponding reference point.

According to the embodiment 1, the method further comprises steps of: receiving a user operation, and generating the augmented reality content configuration information according to the user operation before generating the augmented reality codes according to the augmented reality content configuration information.

According to the embodiment 1, generating the augmented reality content configuration information according to the user operation comprises specific steps of: generating the augmented reality page information based on the user operation such as inputting an address of a webpage that needs to add augmented reality content; generating the augmented reality content information based on the user operation such as inputting augmented reality content identifier and access address corresponding to the webpage; and generating the augmented reality trigger point information based on the user operation such as selecting a reference point for a trigger point within a webpage. Therefore, the user can modify the augmented reality content configuration information through this step, so as to determine the webpage that needs to add or modify the trigger point, the corresponding augmented reality content, and the trigger point information.

According to the embodiment 1, the method further comprises steps of: before generating the augmented reality codes according to the augmented reality content configuration information, judging whether the webpage is set with already existed augmented reality content; if yes, generating the augmented reality codes according to the augmented reality content configuration information; if no, refusing generating the augmented reality codes according to the augmented reality content configuration information.

According to the embodiment 1, judging whether the webpage is set with the already existed augmented reality content comprises specific steps of: identifying domain information of the webpage; identifying address information of the webpage; extracting corresponding augmented reality content configuration information of the webpage according to the domain information and the address information, and judging whether the webpage is set with the already existed augmented reality content according to the corresponding augmented reality content configuration information.

According to the embodiment 1, the method further comprises steps of: authenticating a website to which the webpage belongs; analyzing a domain name, an address, and webpage codes of the website, and determining whether the webpage is qualified for injecting the augmented reality codes. Specifically, authenticating the website to which the webpage belongs comprises specific steps of: analyzing the domain name, the address, and the webpage codes of the website, which may comprises analyzing whether the domain and the address are pre-registered legal domain and address, whether the webpage codes has preset reference points, etc.

In the embodiment 1, the augmented reality codes can be generated according to the augmented reality content configuration information, and the augmented reality codes can be injected into at least one webpage according to the augmented reality content configuration information. As a result, the network administrators can manage the augmented reality content trigger points of the webpage by configuring the augmented reality content configuration information, so as to change the effect of augmented reality content trigger points of the webpage in the website without directly rewriting the webpage codes.

Embodiment 2

Figure 2:
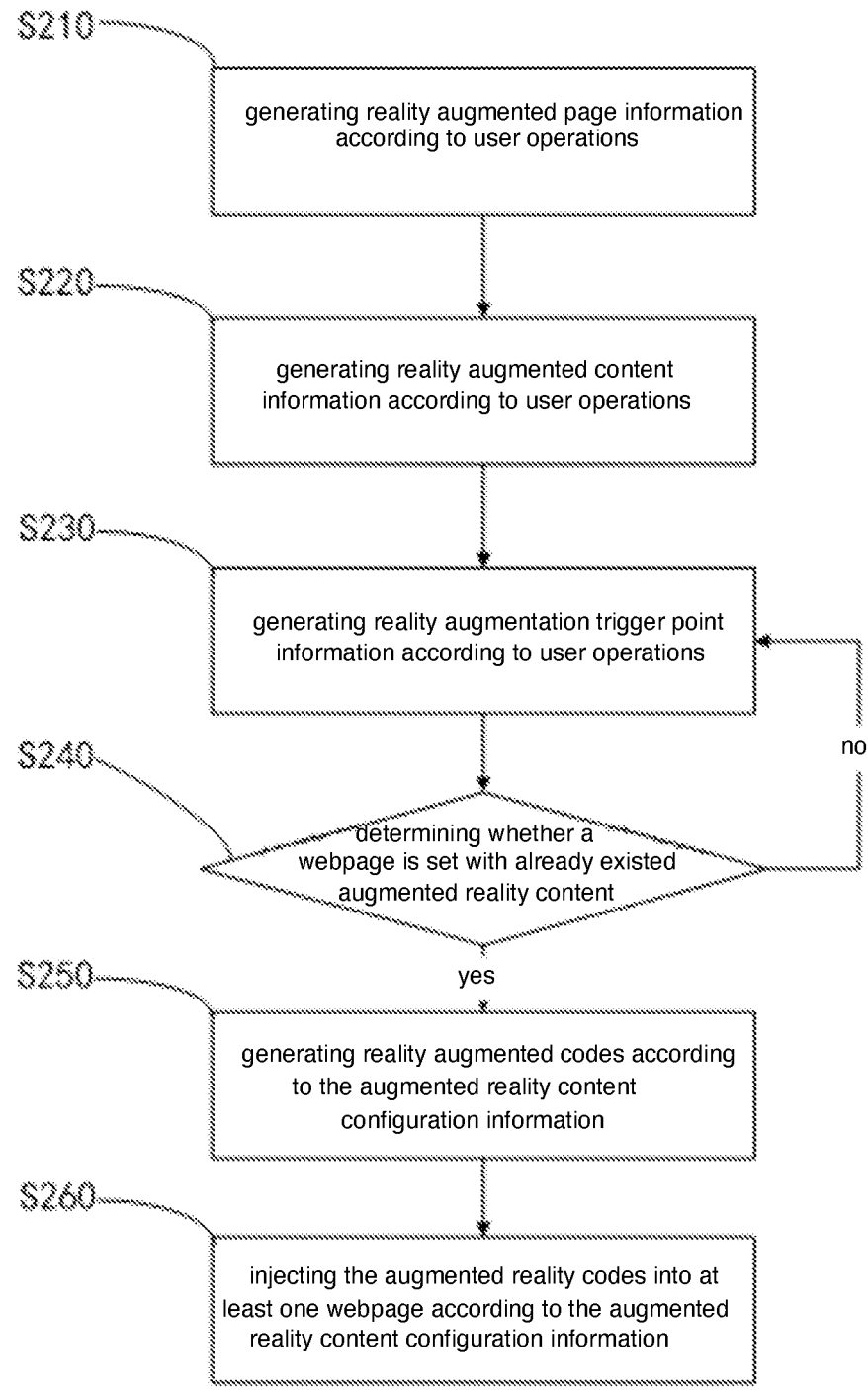
FIG. 2 is a flowchart of a method for distributing augmented reality content according to an embodiment 2 of the present invention.

FIG. 2 is a flowchart of a method for distributing augmented reality content according to the embodiment 2 of the present invention, which comprises steps of:
- S210: generating reality augmented page information according to user operations;
- S220: generating reality augmented content information according to user operations;
- S230: generating reality augmentation trigger point information according to user operations;
- S240: determining whether a webpage is set with already existed augmented reality content, if yes, entering a step S250, otherwise returning to the step S230;
- S250: generating reality augmented codes according to the augmented reality content configuration information; and
- S260: injecting the augmented reality codes into at least one webpage according to the augmented reality content configuration information.

The embodiment 2 can judge whether the webpage needs to inject the augmented reality codes according to the augmented reality content configuration information, and can selectively distribute the augmented reality content on different webpages.

Embodiment 3

Figure 3:
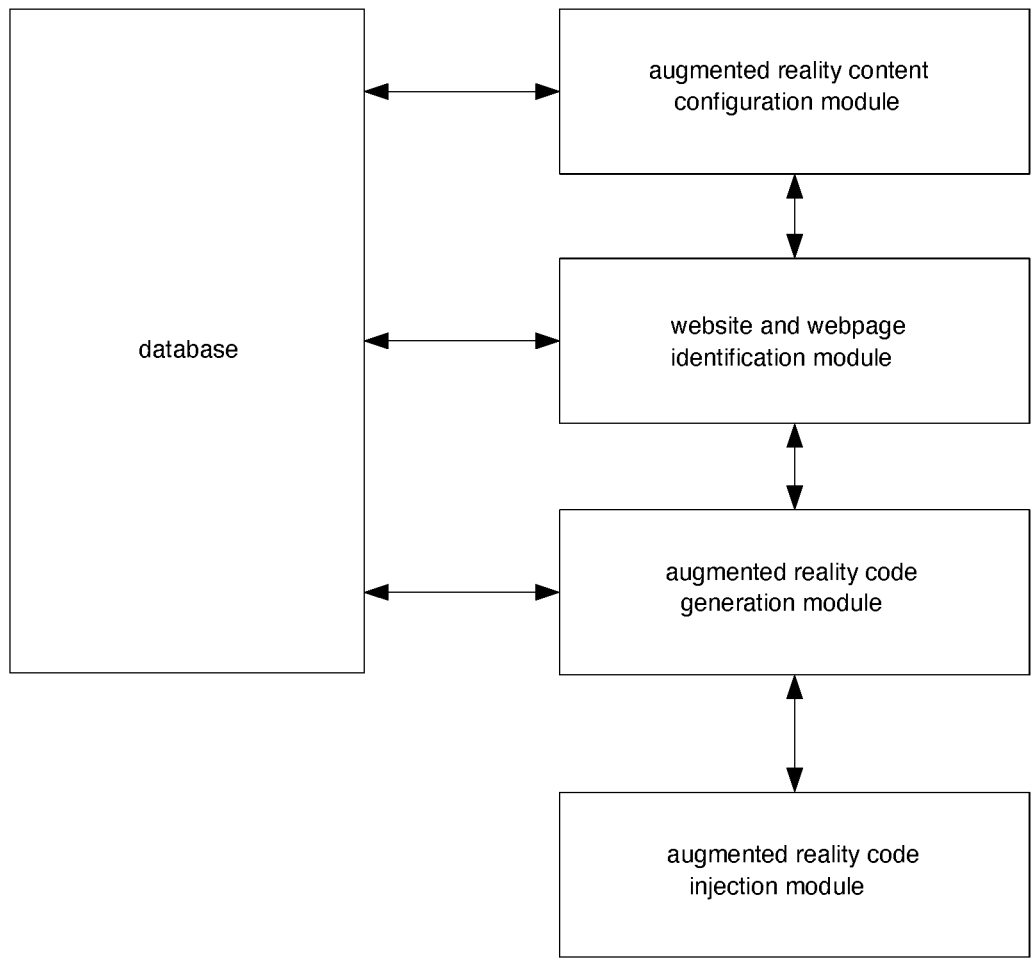
FIG. 3 is a structural view of a system for distributing augmented reality content according to an embodiment 3 of the present invention.

FIG. 3 is a structural view of a system for distributing augmented reality content according to the embodiment 3 of the present invention. Referring to FIG. 3, the system comprises: an augmented reality code generation module and an augmented reality code injection module.

The augmented reality code generation module generates augmented reality codes according to augmented reality content configuration information. The augmented reality content configuration information comprises augmented reality page information, augmented reality content information and augmented reality trigger point information.

The augmented reality code injection module injects the augmented reality codes into at least one webpage according to the augmented reality content configuration information; wherein According to the embodiment 3, the augmented reality trigger point information comprises information of an interactable element, and the interactable element senses a user operation after a terminal is operated, so as to trigger and display the augmented reality content.

According to the embodiment 3, the augmented reality trigger point information further comprises reference point information of a position of the interactable element in the webpage.

According to the embodiment 3, the augmented reality code injection module searches ID or Class of a corresponding reference point in a source code file of the webpage according to the reference point information, and then injects the augmented reality codes into the corresponding reference point.

According to the embodiment 3, the system further comprises an augmented reality content configuration module for receiving a user operation and generating the augmented reality content configuration information according to the user operation before generating the augmented reality codes according to the augmented reality content configuration information.

According to the embodiment 3, before generating the augmented reality codes according to the augmented reality content configuration information, the augmented reality code generation module judges whether the webpage is set with already existed augmented reality content; if yes, generates the augmented reality codes according to the augmented reality content configuration information; if no, refuses generating the augmented reality codes according to the augmented reality content configuration information.

According to the embodiment 3, the system further comprising a website and webpage identification module; wherein the website and webpage identification module comprises: a domain identification module for identifying domain information of the webpage; an address identification module for identifying address information of the webpage; and a configuration extraction module for extracting the augmented reality content configuration information and sending the augmented reality content configuration information to the augmented reality code generation module.

According to the embodiment 3, the system further comprises an authenticating module (not shown in the drawings)

for analyzing a domain name, an address, and webpage codes of the website, thereby determining whether the webpage is qualified for injecting the augmented reality codes.

According to the embodiment 3, the system further comprising a database for storing the augmented reality content configuration information.

The embodiment 3 can automatically change the effect of the augmented reality on the website, which can reduce the maintenance cost of the website and improve the distribution efficiency of the augmented reality content.

Embodiment 4

As another embodiment of the present invention, a computer-readable storage medium is provided for storing a computer program instruction, wherein when the computer program instruction is executed by a processor, the steps of the above method for distributing the augmented reality content can be realized.

The above embodiments are only used to illustrate the technical solutions of the present invention, rather than to limit them. Although the present invention has been described in detail with reference to the above embodiments, those of ordinary skill in the art should understand that: the technical solutions described in the above embodiments can be modified, or some of the technical features can be equivalently replaced; and these modifications or replacements do not make the essence of the corresponding technical solutions deviate from the spirit and scope of the technical solutions of the various embodiments of the present invention.

What is claimed is:

1. A method for distributing augmented reality content, comprising steps of:
   receiving a user operation; wherein the user operation determines a webpage that needs to add the augmented reality content, the augmented reality content to be added, and a trigger page that needs to add or modify a trigger point;
   generating augmented reality content configuration information according to the user operation; wherein the augmented reality content configuration information comprises: augmented reality page information containing an address of the webpage that needs to add the augmented reality content, augmented reality content information containing the address of the augmented reality content to be added, and augmented reality trigger point information containing an address of the trigger page that needs to add or modify the trigger point;
   judging whether the webpage is set with already existed augmented reality content; if yes, generating the augmented reality codes according to the augmented reality content configuration information; if no, refusing generating the augmented reality codes according to the augmented reality content configuration information;
   generating augmented reality codes according to augmented reality content configuration information; and
   injecting the augmented reality codes into the webpage according to the augmented reality content configuration information;
   wherein judging whether the webpage is set with the already existed augmented reality content comprises specific steps of: identifying domain information of the webpage; identifying address information of the webpage; extracting corresponding augmented reality content configuration information of the webpage according to the domain information and the address information, and judging whether the webpage is set with the already existed augmented reality content according to the corresponding augmented reality content configuration information.

2. A system for distributing augmented reality content, comprising:
   an augmented reality content configuration module for receiving a user operation and generating the augmented reality content configuration information according to the user operation; wherein the user operation determines a webpage that needs to add the augmented reality content, the augmented reality content to be added and a trigger page that needs to add or modify a trigger point; wherein the augmented reality content configuration information comprises: augmented reality page information containing an address of the webpage that needs to add the augmented reality content, augmented reality content information containing the address of the augmented reality content to be added, and augmented reality trigger point information containing an address of the trigger page that needs to add or modify the trigger point;
   an augmented reality code generation module to generate augmented reality codes according to augmented reality content configuration information;
   an augmented reality code injection module for injecting the augmented reality codes into the webpage according to the augmented reality content configuration information; and
   a website and webpage identification module, wherein the website and webpage identification module comprises: a domain identification module for identifying domain information of the webpage; an address identification module for identifying address information of the webpage; and a configuration extraction module for extracting the augmented reality content configuration information and sending the augmented reality content configuration information to the augmented reality code generation module.

* * * * *